US009882885B2

(12) United States Patent
Ren

(10) Patent No.: US 9,882,885 B2
(45) Date of Patent: Jan. 30, 2018

(54) SYSTEMS AND METHODS FOR LOGIN AND AUTHORIZATION

(71) Applicant: Tencent Technology (Shenzhen) Company Limited, Shenzhen (CN)

(72) Inventor: Min Ren, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 247 days.

(21) Appl. No.: 14/754,809

(22) Filed: Jun. 30, 2015

(65) Prior Publication Data

US 2015/0304301 A1 Oct. 22, 2015

Related U.S. Application Data

(63) Continuation of application No. PCT/CN2014/080692, filed on Jun. 25, 2014.

(30) Foreign Application Priority Data

Jun. 25, 2013 (CN) .......................... 2013 1 0256475

(51) Int. Cl.
*G06F 7/04* (2006.01)
*H04L 29/06* (2006.01)
(Continued)

(52) U.S. Cl.
CPC .......... *H04L 63/08* (2013.01); *H04L 63/0853* (2013.01); *H04L 67/10* (2013.01); *H04W 12/06* (2013.01)

(58) Field of Classification Search
CPC .............................. H04L 63/08; H04W 12/06
See application file for complete search history.

(56) References Cited

U.S. PATENT DOCUMENTS 9,338,007 B1 * 5/2016 Doshi ................. H04L 63/0815
2012/0240204 A1 * 9/2012 Bhatnagar ............... G06F 21/35
726/5

(Continued)

FOREIGN PATENT DOCUMENTS

CN 102821104 A 12/2012
CN 103001973 A 3/2013
(Continued)

OTHER PUBLICATIONS

Patent Cooperation Treaty, International Search Report and Written Opinion of the International Searching Authority, dated Oct. 14, 2014, in PCT/CN2014/080692.

(Continued)

*Primary Examiner* — Farid Homayounmehr
*Assistant Examiner* — Suman Debnath
(74) *Attorney, Agent, or Firm* — Jones Day

(57) ABSTRACT

Systems and methods are provided for login and authorization. For example, a third-party terminal receives a login request from a user and sends an authorization request from the third-party terminal to a network server; the network server generates first two-dimensional-barcode information and sends the first two-dimensional-barcode information to the third-party terminal; the third-party terminal displays a first two-dimensional-barcode image; a mobile terminal extracts the first two-dimensional-barcode information from the first two-dimensional-barcode image and sends first user account information and the first two-dimensional-barcode information to the network server; the network server validates the first user account information and the first two-dimensional-barcode information based on at least information associated with stored second user account information and second two-dimensional-barcode information generated by the network server.

16 Claims, 11 Drawing Sheets

(51) Int. Cl.
*H04L 29/08* (2006.01)
*H04W 12/06* (2009.01)

(56) References Cited

U.S. PATENT DOCUMENTS

| | | | |
|---|---|---|---|
| 2013/0024919 A1* | 1/2013 | Wetter | G06F 21/335 |
| | | | 726/6 |
| 2013/0048714 A1* | 2/2013 | Sharma | G06Q 20/3276 |
| | | | 235/379 |
| 2013/0179692 A1* | 7/2013 | Tolba | H04L 63/08 |
| | | | 713/179 |
| 2014/0040617 A1* | 2/2014 | Fernandez de Torres | H04L 9/28 |
| | | | 713/168 |

FOREIGN PATENT DOCUMENTS

| | | |
|---|---|---|
| CN | 103001974 A | 3/2013 |
| CN | 103001975 A | 3/2013 |
| CN | 103023917 A | 4/2013 |

OTHER PUBLICATIONS

Patent Cooperation Treaty, International Preliminary Report on Patentability, dated Dec. 29, 2015, in PCT/CN2014/080692.

\* cited by examiner

SYSTEMS AND METHODS FOR LOGIN AND AUTHORIZATION

CROSS-REFERENCES TO RELATED APPLICATIONS

This application is a continuation of International Application No. PCT/CN2014/080692 with an international filing date of Jun. 25, 2014, now pending, which claims priority to Chinese Patent Application No. 201310256475.2, filed Jun. 25, 2013, both applications being incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to login and authorization. But it would be recognized that the invention has a much broader range of applicability.

With development of network technology, instant messaging (IM) software provides a fast, convenient and highly efficient communication platform for people so that all online users can communicate through fast and instant message exchanges via the Internet, enriching the communication manners. With development of the Internet businesses, various network operators add additional features to many third-party applications based on the instant messaging products. For instance, the users can access the Internet to search for information, publish information, and download songs. In addition, the users can conduct instant communications and play online games via network platforms provided by the network operators.

These third-party applications are usually associated with certain servers (e.g., third-party servers) and account systems. That is, a user who intends to access a third-party application needs to log into a network platform using an instant messaging account and a password. Then, the user inputs the account and the password for the third-party application on an interface of the third-party application shown on the network platform. The user account and the password are sent to a third-party server via the network platform. After the third-party server validates the user account and the password, the user can successfully log into the third-party application. Thus, every time the user accesses a third-party application, the user needs to input a user account and a password and/or even a validation code. Account systems of many third-party applications require the user to set a complicated password to ensure sufficient password strength. Therefore, it is not easy for users to remember accounts and associated passwords. Often, a user may forget the accounts and associated passwords. In particular, for mobile equipment (e.g., tablet computers) that has no external keyboard, it is usually inconvenient for users to input accounts, passwords and/or other information.

Furthermore, plaintext passwords transmitted on the Internet for third-party application logins may be intercepted by hackers, which results in leakage of user account data and privacy data. Usually, a user may use multiple third-party applications and a same password may be implemented for these third-party applications. If the leakage of an account and an associated password for a particular third-party application may cause security issues to a plurality of third-party applications.

Hence it is highly desirable to improve the techniques for login and authorization.

BRIEF SUMMARY OF THE INVENTION

According to one embodiment, a method is provided for login and authorization. For example, a third-party terminal receives a login request from a user and sends an authorization request from the third-party terminal to a network server; the network server generates first two-dimensional-barcode information and sends the first two-dimensional-barcode information to the third-party terminal; the third-party terminal displays a first two-dimensional-barcode image; a mobile terminal extracts the first two-dimensional-barcode information from the first two-dimensional-barcode image and sends first user account information and the first two-dimensional-barcode information to the network server; the network server validates the first user account information and the first two-dimensional-barcode information based on at least information associated with stored second user account information and second two-dimensional-barcode information generated by the network server; in response to the first user account information and the first two-dimensional-barcode information being validated, the network server sends an authorization and a predetermined user identifier to a third-party server; the third-party server sets a user account associated with the user identifier to a logged-in state; the third-party terminal acquires information related to the logged-in state from the third-party server and sets an interface of a first third-party application to a user-logged-in state.

According to another embodiment, a method is provided for login. For example, a login request is received from a user; an authorization request is sent to a network server; two-dimensional-barcode information is received from the network server; a two-dimensional-barcode image is displayed; information related to a logged-in state of a user account is acquired from a third-party server; and an interface of a third-party application is set to a user-logged-in state. The third-party server sets the user account to the logged-in state and sends the information related to the logged-in state of the user account after the network server validates user account information sent from a mobile terminal and the two-dimensional-barcode information extracted from the first two-dimensional-barcode image.

According to yet another embodiment, a method is provided for authorization. For example, an authorization request is received from a third-party terminal; first two-dimensional-barcode information is generated; the first two-dimensional-barcode information is sent to the third-party terminal so that the third-party terminal displays a first two-dimensional-barcode image; user account information and the first two-dimensional-barcode information sent from a mobile terminal are validated based on at least information associated with stored user account information and second two-dimensional-barcode information, wherein the first two-dimensional-barcode information sent from the mobile terminal is extracted by the mobile terminal from the first two-dimensional-barcode image displayed on the third-party terminal; and in response to the user account information and the first two-dimensional-barcode information being validated, an authorization and a predetermined user identifier are sent to the third-party server.

According to yet another embodiment, a login-and-authorization system includes: a third-party terminal, a network server, a mobile terminal and a third-party server. The third-party terminal is configured to: receive a login request from a user, send an authorization request to the network server, receive first two-dimensional-barcode information from the network server, display a first two-dimensional-barcode image, acquire information related to a logged-in state of a user account from the third-party server, and set an interface of a third-party application to a user-logged-in state. The network server is configured to: receive the authorization request from the third-party terminal; generate the first two-dimensional-barcode information, send the first two-dimensional-barcode information to the third-party terminal, validate user account information and the first two-dimensional-barcode information sent from the mobile terminal based on at least information associated with stored user account information and second two-dimensional-barcode information, and in response to the user account information and the first two-dimensional-barcode information being validated, send an authorization and a predetermined user identifier to the third-party server. The mobile terminal is configured to extract the first two-dimensional-barcode information from the first two-dimensional-barcode image displayed by the third-party terminal and send the user account information and the first two-dimensional-barcode information to the network server. The third-party server is configured to set the user account associated with the user identifier sent from the network server to the logged-in state.

In one embodiment, a third-party terminal includes: a login-request-receiving unit, a login-request-sending unit, a two-dimensional-barcode-information-receiving unit, a display unit, a login-information-receiving unit, and a control unit. The login-request-receiving unit is configured to receive a login request from a user. The login-request-sending unit is configured to send an authorization request to a network server. The two-dimensional-barcode-information-receiving unit is configured to receive two-dimensional-barcode information from the network server. The display unit is configured to display a two-dimensional-barcode image. The login-information-receiving unit is configured to receive information related to a logged-in state of a user account from a third-party server. The control unit is configured to set an interface of a third-party application to a user-logged-in state based on at least information associated with the information related to the logged-in state of the user account. The third-party server sets the user account to the logged-in state and sends the information related to the logged-in state of the user account after the network server validates user account information sent from a mobile terminal and the two-dimensional-barcode information extracted from the first two-dimensional-barcode image.

In another embodiment, a network server includes: an authorization-request-receiving unit, a two-dimensional-barcode-generation unit, a two-dimensional-barcode-sending unit, a validation-information-receiving unit, a validation unit, and an authorization-information-sending unit. The authorization-request-receiving unit is configured to receive an authorization request from a third-party terminal. The two-dimensional-barcode-generation unit is configured to generate first two-dimensional-barcode information. The two-dimensional-barcode-sending unit is configured to send the first two-dimensional-barcode information to the third-party terminal so that the third-party terminal displays a first two-dimensional-barcode image. The validation-information-receiving unit is configured to receive user account information and the first two-dimensional-barcode information from a mobile terminal. The validation unit is configured to validate the user account information and the first two-dimensional-barcode information based on at least information associated with stored user account information and second two-dimensional-barcode information generated by the two-dimensional-barcode-generation unit, wherein the first two-dimensional-barcode information sent from the mobile terminal is extracted by the mobile terminal from the first two-dimensional-barcode image displayed on the third-party terminal. The authorization-information-sending unit is configured to, in response to the user account information and the first two-dimensional-barcode information being validated, send an authorization and a predetermined user identifier to the third-party server.

In yet another embodiment, a non-transitory computer readable storage medium includes programming instructions for login. The programming instructions configured to cause one or more data processors to execute certain operations. For example, a login request is received from a user; an authorization request is sent to a network server; two-dimensional-barcode information is received from the network server; a two-dimensional-barcode image is displayed; information related to a logged-in state of a user account is acquired from a third-party server; and an interface of a third-party application is set to a user-logged-in state. The third-party server sets the user account to the logged-in state and sends the information related to the logged-in state of the user account after the network server validates user account information sent from a mobile terminal and the two-dimensional-barcode information extracted from the first two-dimensional-barcode image.

In yet another embodiment, a non-transitory computer readable storage medium includes programming instructions for authorization. The programming instructions configured to cause one or more data processors to execute certain operations. For example, an authorization request is received from a third-party terminal; first two-dimensional-barcode information is generated; the first two-dimensional-barcode information is sent to the third-party terminal so that the third-party terminal displays a first two-dimensional-barcode image; user account information and the first two-dimensional-barcode information sent from a mobile terminal are validated based on at least information associated with stored user account information and second two-dimensional-barcode information, wherein the first two-dimensional-barcode information sent from the mobile terminal is extracted by the mobile terminal from the first two-dimensional-barcode image displayed on the third-party terminal; and in response to the user account information and the first two-dimensional-barcode information being validated, an authorization and a predetermined user identifier are sent to the third-party server.

For example, the systems and methods described herein are configured for third-party login and authorization by using a mobile terminal to scan a two-dimensional barcode, which eliminates the need to install any plug-ins or applications on the mobile terminal and/or a third-party terminal and eliminates the need to repeatedly input user names and passwords during the login and authorization process for a third-party application, so as to allow convenient operations, save memory cost for memorizing a plurality of user names and passwords, reduce the risk of password leakage and improve the safety of information transmission. In another example, the systems and methods described herein are configured to implement a two-dimensional barcode so as to allow a third-party application to be run on a TV, a public-inquiry machine and/or other third-party terminals without a keyboard, hence expanding the scope of application of the login technology.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
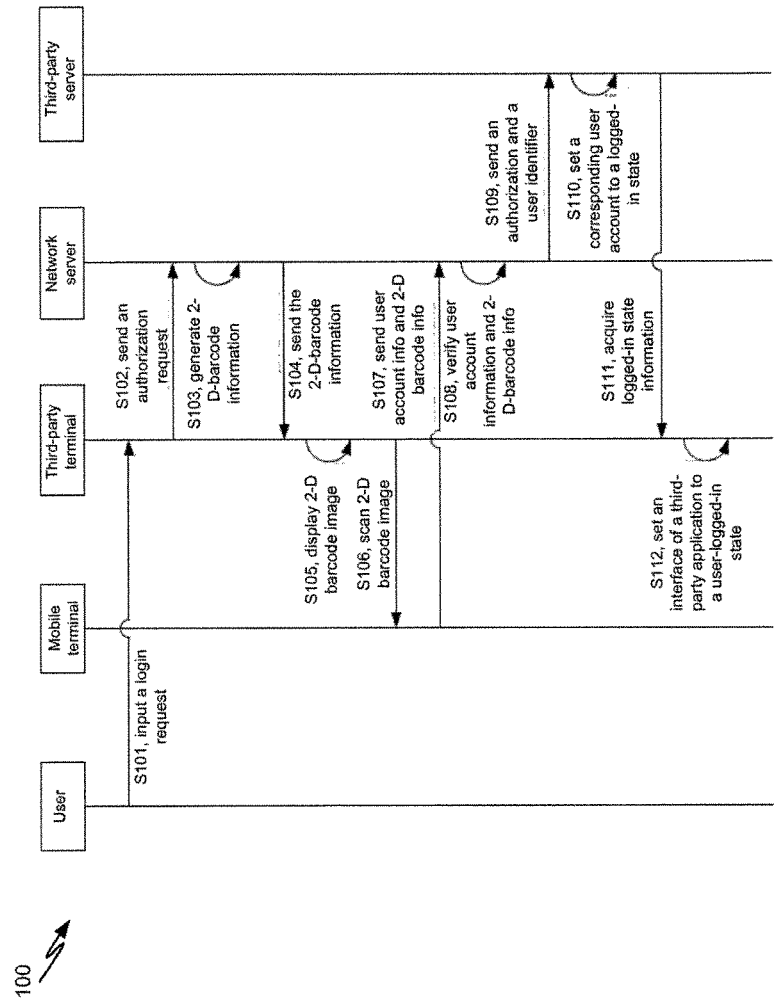
FIG. 1 is a simplified diagram showing a method for login and authorization according to one embodiment of the present invention.

FIG. 1 is a simplified diagram showing a method for login and authorization according to one embodiment of the present invention. This diagram is merely an example, which should not unduly limit the scope of the claims. One of ordinary skill in the art would recognize many variations, alternatives, and modifications. The method 100 includes at least the processes S101-S112.

According to one embodiment, during the process S101, the third-party terminal receives a login request from a user. For example, the third-party terminal can display to the user a login interface of a third-party application. In another example, during the process S102, the third-party terminal sends an authorization request to the network server after receiving the login request. The authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In yet another example, the application identifier "appid" represents an application identifier number allocated by a network server to the third-party application. In yet another example, a particular application identifier "appid" corresponds to a particular third-party application. In yet another example, the authorization scope information "scope" refers to an authorization scope of operations associated with a user account after the third-party server receives authorization from the network server. As an example, the third-party application is authorized to use a headshot and/or a nickname associated with the user account, or authorized to post a microblog message on behalf of the user. As another example, the application callback address "redirect_url" represents an address at which the third-party application receives information. As yet another example, the anti-disguise information "state" and application key "appkey" are used to improve the security of data transmission.

According to another embodiment, during the process S103, the network server generates two-dimensional-barcode information after receiving the authorization request. For example, a two-dimensional barcode, or a matrix barcode, represents a readable barcode developed based on one-dimensional barcodes. In another example, a device scans a two-dimensional barcode to identify binary data recorded along the length and the width of the barcode and hence acquire two-dimensional-barcode information contained therein. Compared with a one-dimensional barcode, a two-dimensional barcode records more complicated data, such as images and network links. In another example, the two-dimensional-barcode information includes the authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey").

According to yet another embodiment, during the process S104, the network server sends the two-dimensional-barcode information to the third-party terminal. For example, during the process S105, the third-party terminal displays a two-dimensional-barcode image after receiving the two-dimensional-barcode information. In another example, during the process S106, the mobile terminal extracts the two-dimensional-barcode information in the two-dimensional-barcode image. As an example, scanning software installed on the mobile terminal is used to scan the two-dimensional-barcode image to extract the two-dimensional-barcode information therein. In yet another example, during the process S107, the mobile terminal sends user account information and the information extracted from the two-dimensional-barcode image to the network server.

In one embodiment, during the process S108, the network server validates the user account information and the two-dimensional-barcode information sent from the mobile terminal according to stored user account information and other two-dimensional-barcode information generated by the network server. For example, an application for scanning two-dimensional barcodes is started on the mobile terminal to send the user account information. In another example, the application and the network server are from a same network operator. The application can be logged in. The user account information is transmitted to the network server and the validation process is completed during the login process of the application. As an example, the user account information can be validated so long as a user pre-stores (e.g., registers) an account in the network server in advance. In one example, after validation, a communication link between the mobile terminal and the network server is established so that the two-dimensional-barcode information can be sent to the network server for validation.

In another embodiment, during the process S109, if the validation is successful, the network server sends authorization information (e.g., an authorization) and a predetermined user identifier to the third-party server. For example, the user identifier represents a unique identifier of a user after the user logs into a third-party application. As an example, based on the user identifier, the third-party application allows the login of the corresponding user. In one example, a user identifier uniquely corresponds to a user account. In another example, when a user account logs into different third-party applications, the user account corresponds to different user identifiers. For example, the authorization information includes an authorization validity character string (e.g., "token") and anti-disguise information (e.g., "state"). The authorization validity character string (e.g., "token") is configured to indicate the validity of the user authorization, and the anti-disguise information (e.g., "state") works to improve the security of data transmission, in some embodiments.

In yet another embodiment, during the process S110, the third-party server sets a user account corresponding to the received user identifier to a logged-in state. For example, during the process S111, the third-party terminal acquires information related to the logged-in state from the third-party server. In another example, during the process S112, the third-party terminal sets an interface of the third-party application to a user-logged-in state.

Figure 2:
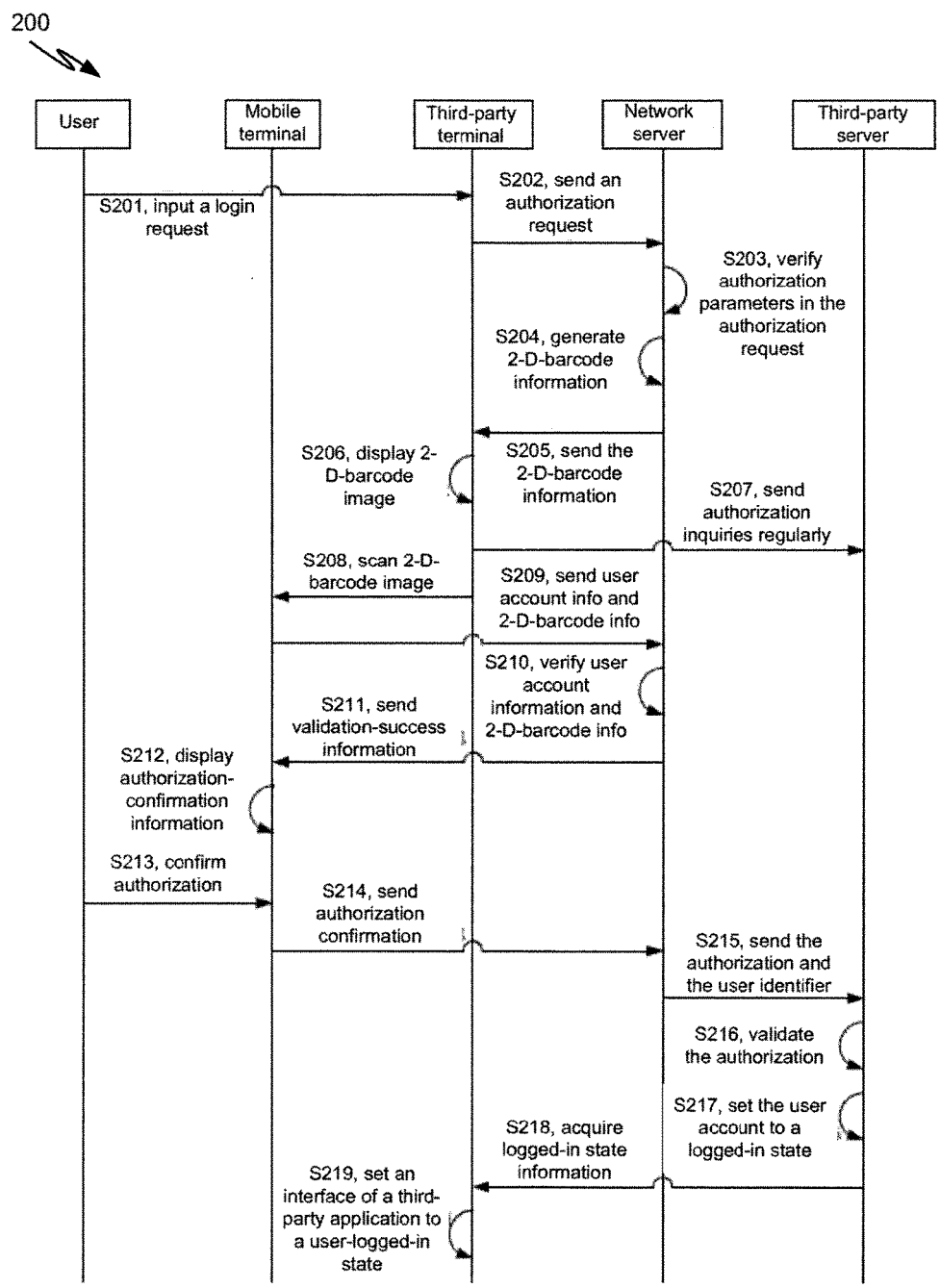
FIG. 2 is a simplified diagram showing a method for login and authorization according to another embodiment of the present invention.

FIG. 2 is a simplified diagram showing a method for login and authorization according to another embodiment of the present invention. This diagram is merely an example, which should not unduly limit the scope of the claims. One of ordinary skill in the art would recognize many variations, alternatives, and modifications. The method 200 includes at least the processes S201-S219.

According to one embodiment, during the process S201, the third-party terminal receives a login request from a user. For example, during the process S202, the third-party terminal sends an authorization request to the network server after receiving the login request. In another example, the authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In yet another example, during the process S203, the network server validates the authorization parameters in the authorization request. For instance, the validation process includes determining if the application identifier "appid", the authorization scope information "scope" and the application callback address "redirect_url" are consistent with the predetermined parameters that are assigned to the third-party application.

According to another embodiment, during the process S204, the network server generates two-dimensional-barcode information after receiving the authorization request. For example, the two-dimensional-barcode information includes the authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey"). In another example, during the process S205, the network server sends the two-dimensional-barcode information to the third-party terminal. In yet another example, during the process S206, the third-party terminal displays a two-dimensional-barcode image after receiving the two-dimensional-barcode information.

According to yet another embodiment, during the process S207, the third-party terminal sends one or more authorization inquiries at one or more predetermined times to the third-party server. For example, the authorization inquiries are used to inquire about the login state of the user. That is, whether the third-party server receives the user identifier, so that the login state displayed on the third-party application can be updated in a timely manner after the authorization is passed. In another example, during the process S208, the mobile terminal extracts information from the two-dimensional-barcode image. As an example, scanning software installed on the mobile terminal is used to scan the two-dimensional-barcode image to extract the two-dimensional-barcode information therein.

In one embodiment, during the process S209, the mobile terminal sends user account information and the information extracted from the two-dimensional-barcode image to the network server. For example, during the process S210, the network server validates the user account information and the two-dimensional-barcode information sent from the mobile terminal according to stored user account information and other two-dimensional-barcode information generated by the network server. In another example, during the process S211, if the validation is successful, the network server sends the validation-success information to the mobile terminal. In yet another example, during the process S212, the mobile terminal displays authorization confirmation information. In yet another example, the authorization confirmation information includes a name of a third-party application and an authorization scope of the third-party application, so that a user knows the name and the authorization scope of a target application.

In another embodiment, during the process S213, the mobile terminal receives an authorization confirmation from a user. For example, the user is given a chance to choose whether to log into the third-party application via a user account. In another example, during the process S214, the mobile terminal sends the authorization confirmation from the user to the network server. In yet another example, during the process S215, the network server sends authorization information (e.g., an authorization) and a predetermined user identifier to the third-party server. For example, the user identifier represents a unique identifier of a user after the user logs into a third-party application. As an example, based on the user identifier, the third-party application allows the login of the corresponding user. In one example, a user identifier uniquely corresponds to a user account. In another example, when a user account logs into different third-party applications, the user account corresponds to different user identifiers. For example, the authorization information includes an authorization validity character string (e.g., "token") and anti-disguise information (e.g., "state").

In yet another embodiment, during the process S216, the third-party server validates the received authorization. For instance, the validation process includes determining if the anti-disguise information "state" is in the authorization information. As an example, during the process S217, the third-party server sets a user account corresponding to the received user identifier to a logged-in state. As another example, during the process S218, the third-party terminal acquires information related to the logged-in state from the third-party server. In one example, during the process S219, the third-party terminal sets an interface of the third-party application to a user-logged-in state.

Figure 3:
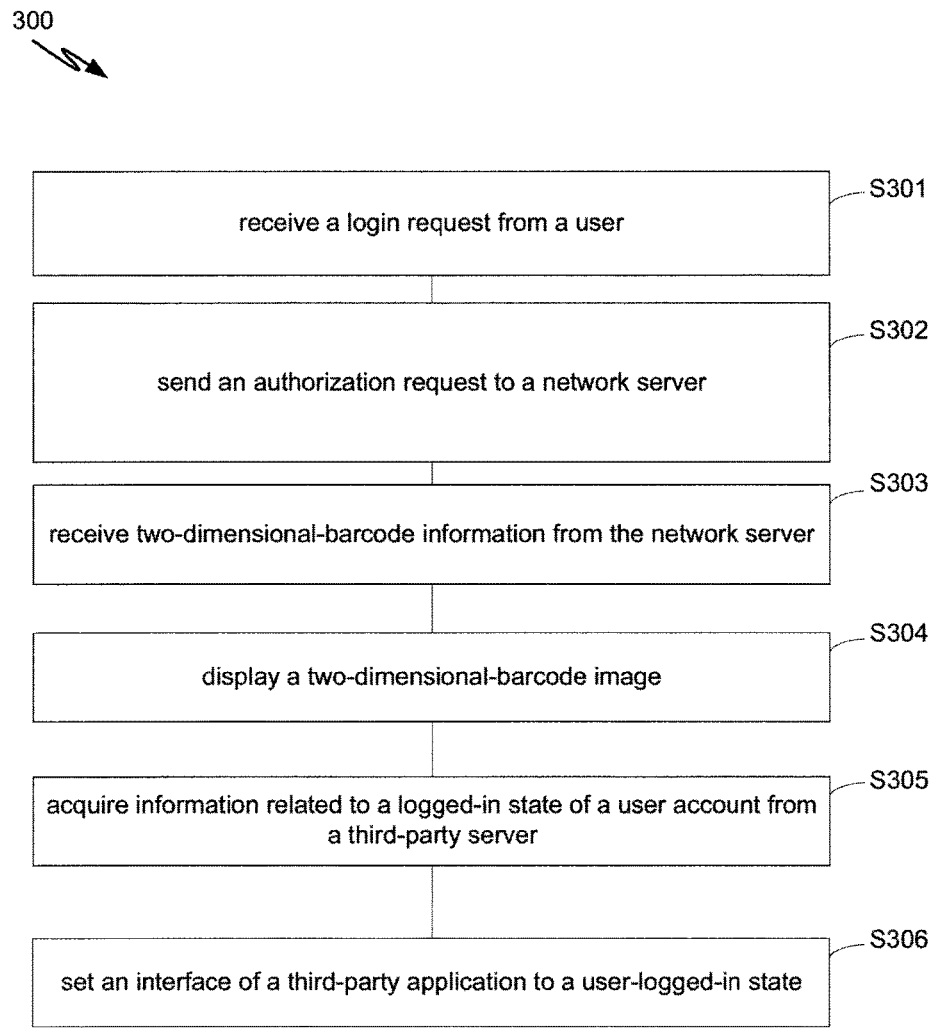
FIG. 3 is a simplified diagram showing a method for login according to one embodiment of the present invention.

FIG. 3 is a simplified diagram showing a method for login according to one embodiment of the present invention. This diagram is merely an example, which should not unduly limit the scope of the claims. One of ordinary skill in the art would recognize many variations, alternatives, and modifications. The method 300 includes at least processes S301-S306.

According to one embodiment, the process S301 includes receiving a login request from a user. For example, the process S302 includes sending an authorization request to a network server. The authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In another example, the process S303 includes receiving two-dimensional-barcode information sent from the network server. In yet another example, the two-dimensional-barcode information includes the authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey").

According to another embodiment, the process S304 includes displaying a two-dimensional-barcode image. For example, the process S305 includes acquiring information related to a logged-in state of a user account from a third-party server. In another example, the information related to the logged-in state of the user account is sent after the network server validates the user account information sent from a mobile terminal and the information extracted from the two-dimensional-barcode image and the third-party server sets the user account to the logged-in state. In yet another example, the process S306 includes setting an interface of a third-party application to a user-logged-in state.

Figure 4:
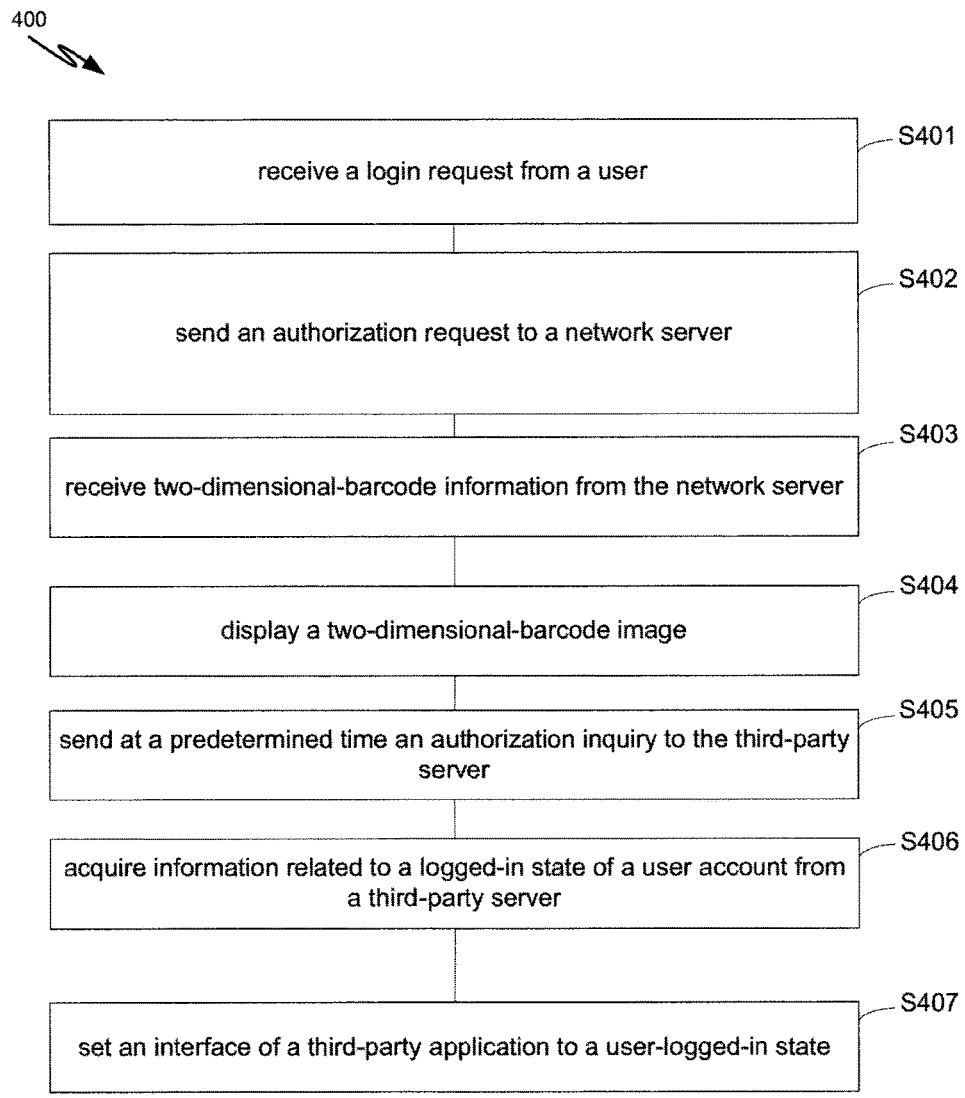
FIG. 4 is a simplified diagram showing a method for login according to another embodiment of the present invention.

FIG. 4 is a simplified diagram showing a method for login according to another embodiment of the present invention. This diagram is merely an example, which should not unduly limit the scope of the claims. One of ordinary skill in the art would recognize many variations, alternatives, and modifications. The method 400 includes at least processes S401-S407.

According to one embodiment, the process S401 includes receiving a login request from a user. For example, the process S402 includes sending an authorization request to a network server. The authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In another example, the process S403 includes receiving two-dimensional-barcode information sent from the network server. In yet another example, the two-dimensional-barcode information includes the authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey").

According to another embodiment, the process S404 includes displaying a two-dimensional-barcode image. For example, the process S405 includes sending one or more authorization inquiries at one or more predetermined times to a third-party server. In another example, the authorization inquiry information is used to inquire about the login state of the user, namely whether the third-party server receives the user identifier, so that the login state displayed on the third-party application can be updated in a timely manner after the authorization is passed. In yet another example, the process S406 includes acquiring logged-in state information of a user account from the third-party server. The user account logged-in state information is sent after validation of the network server on the user account information sent from a mobile terminal and the information read from the two-dimensional-barcode image is passed and the third-party server sets the user account to the logged-in state. In yet another example, the process S407 includes setting an interface of a third-party application to a user-logged-in state.

Figure 5:
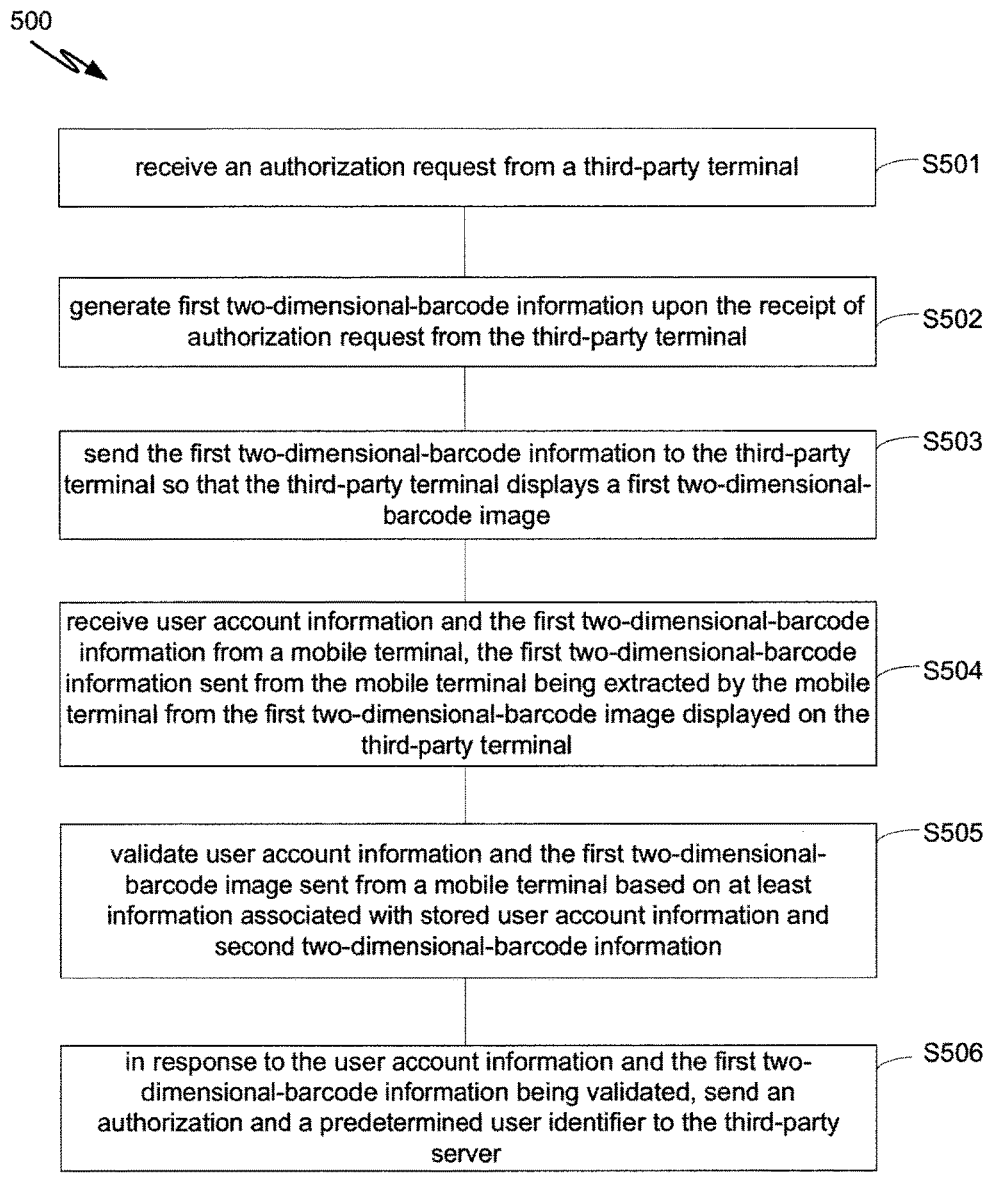
FIG. 5 is a simplified diagram showing a method for authorization according to one embodiment of the present invention.

FIG. 5 is a simplified diagram showing a method for authorization according to one embodiment of the present invention. This diagram is merely an example, which should not unduly limit the scope of the claims. One of ordinary skill in the art would recognize many variations, alternatives, and modifications. The method 500 includes at least processes S501-S506.

According to one embodiment, the process S501 includes receiving an authorization request sent from a third-party terminal. For example, the authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In another example, the process S502 includes generating two-dimensional-barcode information upon the receipt of the authorization request sent from the third-party terminal. In yet another example, the two-dimensional-barcode information includes the authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey").

According to another embodiment, the process S503 includes sending the two-dimensional-barcode information to the third-party terminal so that the third-party terminal displays a two-dimensional-barcode image. For example, the process S504 includes receiving user account information and the two-dimensional-barcode information sent from the mobile terminal, where the two-dimensional-barcode information sent from the mobile terminal is acquired by the mobile terminal from the two-dimensional-barcode image displayed on the third-party terminal. In another example, the process S505 includes validating the user account information and the two-dimensional-barcode information sent from the mobile terminal according to stored user account information and other two-dimensional-barcode information generated by the network server.

According to yet another embodiment, the process S506 includes, if the validation is successful, sending authorization information (e.g., an authorization) and a predetermined user identifier to the third-party server. For example, the user identifier represents a unique identifier of a user after the user logs into a third-party application. As an example, based on the user identifier, the third-party application allows the login of the corresponding user. In one example, a user identifier uniquely corresponds to a user account. In another example, when a user account logs into different third-party applications, the user account corresponds to different user identifiers. For example, the authorization information includes an authorization validity character string (e.g., "token") and anti-disguise information (e.g., "state").

Figure 6:
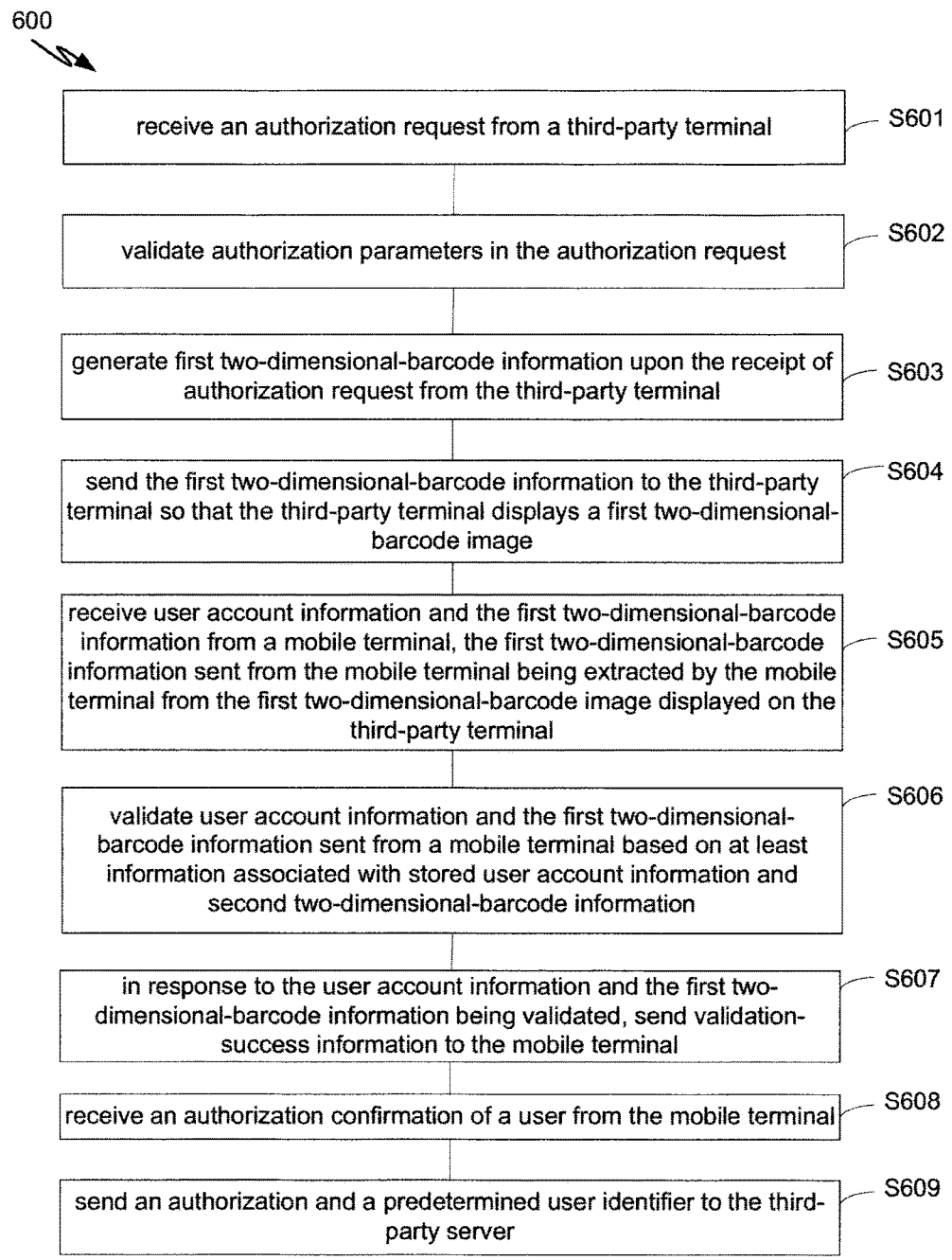
FIG. 6 is a simplified diagram showing a method for authorization according to another embodiment of the present invention.

FIG. 6 is a simplified diagram showing a method for authorization according to another embodiment of the present invention. This diagram is merely an example, which should not unduly limit the scope of the claims. One of ordinary skill in the art would recognize many variations, alternatives, and modifications. The method 600 includes at least processes S601-S609.

According to one embodiment, the process S601 includes receiving an authorization request sent from a third-party terminal. For example, the authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In another example, the process S602 includes validating the authorization parameters in the authorization request. For instance, the validation process includes determining if the application identifier "appid", the authorization scope information "scope" and the application callback address "redirect_url" are consistent with the predetermined parameters that are assigned to the third-party application.

According to another embodiment, the process S603 includes generating two-dimensional-barcode information upon the receipt of the authorization request sent from the third-party terminal. For example, the two-dimensional-barcode information includes the authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey"). In another example, the process S604 includes sending the two-dimensional-barcode information to the third-party terminal so that the third-party terminal displays a two-dimensional-barcode image. In yet another example, the process S605 includes receiving user account information and the two-dimensional-barcode information sent from the mobile terminal, where the two-dimensional-barcode information sent from the mobile terminal is acquired by the mobile terminal from the two-dimensional-barcode image displayed on the third-party terminal.

According to yet another embodiment, the process S606 includes validating the user account information and the two-dimensional-barcode information sent from the mobile terminal according to stored user account information and other two-dimensional-barcode information generated by the network server. For example, the process S607 includes, if the validation is successful, sending validation-success information to the mobile terminal. In yet another example, the authorization confirmation information includes a name of a third-party application and an authorization scope of the third-party application, so that a user knows the name and the authorization scope of a target application. In yet another example, the process S608 includes receiving an authorization confirmation from the user sent from the mobile terminal, which indicates that the user confirms to log into the third-party application. In yet another example, the process S609 includes sending authorization information (e.g., an authorization) and a predetermined user identifier to the third-party server. For example, the user identifier represents a unique identifier of a user after the user logs into a third-party application. As an example, based on the user identifier, the third-party application allows the login of the corresponding user. In one example, a user identifier uniquely corresponds to a user account. In another example, when a user account logs into different third-party applications, the user account corresponds to different user identifiers. For example, the authorization information includes an authorization validity character string (e.g., "token") and anti-disguise information (e.g., "state").

Figure 7:
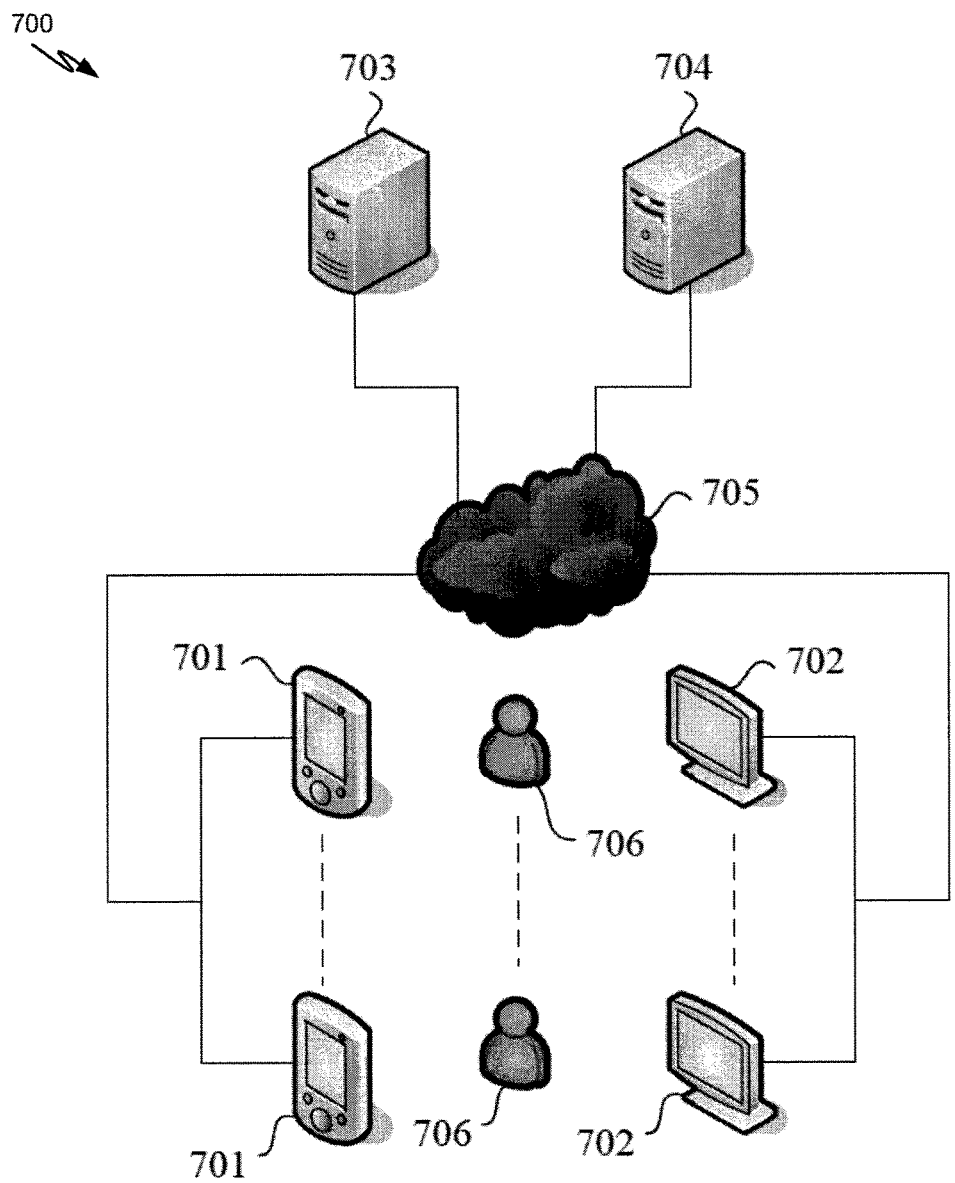
FIG. 7 is a simplified diagram showing a login-and-authorization system according to one embodiment of the present invention.

FIG. 7 is a simplified diagram showing a login-and-authorization system according to one embodiment of the present invention. This diagram is merely an example, which should not unduly limit the scope of the claims. One of ordinary skill in the art would recognize many variations, alternatives, and modifications. The login-and-authorization system includes one or more mobile terminals 701, one or more third-party terminals 702, a network server 703 and a third-party server 704.

According to one embodiment, the mobile terminals 701, the third-party terminals 702, the network server 703 and the third-party server 704 are connected to a network 705. For example, one or more users 706 operate the mobile terminals 701 and the third-party terminals 702. In another example, when the users 706 input a login request on an interface of a third-party application displayed on the third-party terminals 702, the interface of the third-party application displays a user login prompt. In yet another example, the third-party terminals 702 send an authorization request to the network server 703. In yet another example, the network server 703 generates two-dimensional-barcode information and sends the two-dimensional-barcode information to the third-party terminals 702 after receiving the authorization request sent from the third-party terminals 702. In yet another example, the third-party terminals 702 displays a two-dimensional-barcode image after receiving the two-dimensional-barcode information sent from the network server 703.

According to another embodiment, when the users 706 view the two-dimensional-barcode image displayed on the interface of the third-party terminals 702, the users 706 use a scanning tool on the mobile terminals 701 to scan the two-dimensional-barcode image and extract the information contained therein, and then sends user account information and the information extracted from the two-dimensional-barcode image to the network server 703 through the mobile terminals 701. For example, after receiving the user account information and the two-dimensional-barcode information extracted from the image sent from the mobile terminals 701, the network server 703 validates the user account information and the two-dimensional-barcode information sent from the mobile terminals 701 according to stored user account information and other two-dimensional-barcode information generated by the network server. In yet another example, the scanning tool on the mobile terminals 701 includes an application for scanning and login that is supplied by an operator of the network server 703, such as an instant messaging software. In yet another example, when the users 706 logs into the application in the mobile terminals 701 using a user account, the validation of such user account by the network server 703 is completed. The information acquired by the mobile terminals 701 through scanning the two-dimensional-barcode image is sent to the network server 703 for validation, in some embodiments.

According to yet another embodiment, if the validation is successful, the network server 703 sends authorization information (e.g., an authorization) and a predetermined user identifier to the third-party server 704. For example, the user identifier represents a unique identifier of the users 706 after the users 706 log into the third-party application. As an example, based on the user identifier, the third-party application allows login of the corresponding users 706, and the authorization process is completed. In one example, the third-party server 704 sets the user account corresponding to the user identifier to a logged-in state after receiving the authorization information and the predetermined user identifier sent from the network server 703. In another example, after acquiring information related to the logged-in state of the user account from the third-party server 704, the third-party terminals 702 set the interface of the third-party application to a user-logged-in state, and the login process is completed.

In one embodiment, the authorization request sent by the third-party terminals 702 to the network server 703 includes authorization parameters, e.g., the application identifier (e.g., "appid"), the authorization scope information (e.g., "scope"), the application callback address (e.g., "redirect_url"), the anti-disguise information (e.g., "state") and/or the application key (e.g., "appkey"). For example, the network server 703 validates the authorization parameters in the authorization request after receiving the authorization request sent from the third-party terminals 702. For instance, the validation process includes determining if the application identifier "appid", the authorization scope information "scope" and the application callback address "redirect_url" are consistent with the predetermined parameters that are assigned to the third-party application. In one example, the two-dimensional-barcode information generated by the network server 703 includes the authorization parameters. In another example, the third-party terminals 702 regularly send authorization inquiries to the third-party server 704 after displaying the two-dimensional-barcode image. For example, the authorization inquiries are used to inquire about the login state of the users 706. In another example, the authorization inquiries are used to inquire about whether the third-party server 704 receives the user identifier, so that the login state displayed on the third-party application can be updated in a timely manner after the authorization is passed.

In another embodiment, after the validation of the user account information and the two-dimensional-barcode information sent from the mobile terminals 701 is passed, the network server 703 sends the validation-success information to the mobile terminals 701 so that the mobile terminals 701 displays the authorization confirmation information. The authorization confirmation information includes a name of a third-party application and an authorization scope of the third-party application, so that a user knows the name and the authorization scope of a target application. For example, the users 706 can be given a chance to choose whether to log into the third-party application via a user account. In another example, the mobile terminals 701 receive the authorization confirmation from the users 706 and send the authorization confirmation to the network server 703 so that the network server 703 sends authorization information (e.g., an authorization) and a predetermined user identifier to the third-party server 702. For example, the user identifier sent by the network server 703 to the third-party server 704 uniquely corresponds to a user account. In another example, when a user account logs into different third-party applications, the user account corresponds to different user identifiers. For example, the authorization information sent by the network server 703 to the third-party server 704 includes an authorization validity character string (e.g., "token") and anti-disguise information (e.g., "state"). In another example, the third-party server 704 validates the authorization information after receiving the authorization information sent from the network server 703. For instance, the validation process includes determining whether the anti-disguise information "state" is in the authorization information.

Figure 8:
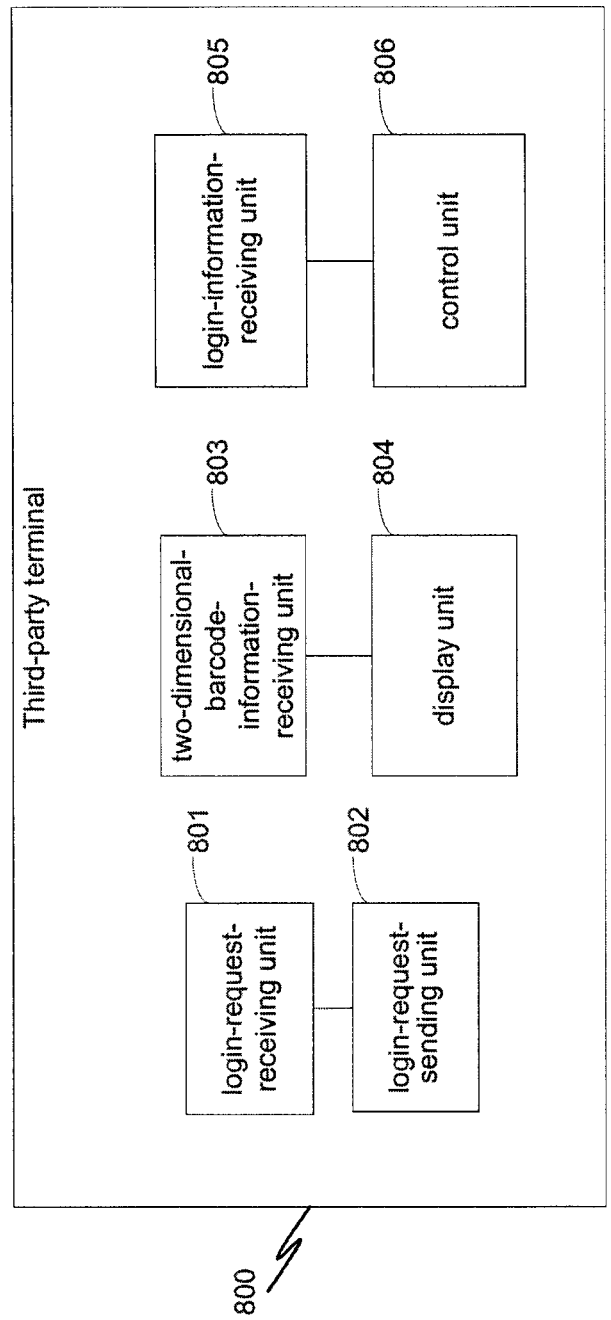
FIG. 8 is a simplified diagram showing a third-party terminal according to one embodiment of the present invention.

FIG. 8 is a simplified diagram showing a third-party terminal according to one embodiment of the present invention. This diagram is merely an example, which should not unduly limit the scope of the claims. One of ordinary skill in the art would recognize many variations, alternatives, and modifications. The third-party terminal 800 includes a login-request-reception unit 801, a login-request-sending unit 802, a two-dimensional-barcode-information-receiving unit 803, a display unit 804, a login-information-receiving unit 805 and a control unit 806.

According to one embodiment, the login-request-sending unit 802 is connected to the login-request-reception unit 801. For example, the display unit 804 is connected to the two-dimensional-barcode-information-receiving unit 803. In another example, the control unit 806 is connected to the login-information-receiving unit 805. In yet another example, the login-request-reception unit 801 is configured to receive a login request from a user. In yet another example, the authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey").

According to another embodiment, the login-request-sending unit 802 is configured to send an authorization request to a network server after the login-request-reception unit 801 receives a login request from a user. For example, the two-dimensional-barcode-information-receiving unit 803 is configured to receive two-dimensional-barcode information sent from the network server. In another example, the two-dimensional-barcode information includes the authorization parameters. In yet another example, the display unit 804 is configured to display a two-dimensional-barcode image after the two-dimensional-barcode-information-receiving unit 803 receives the two-dimensional-barcode information. In yet another example, the login-information-receiving unit 805 is configured to receive information related to a logged-in state of a user account sent from a third-party server. In yet another example, the control unit 806 is configured to set a user-login interface of a third-party application to a logged-in state according to the information related to the logged-in state of the user account received by the login-information-receiving unit 805. The user account logged-in state information is sent after validation of the network server on the user account information sent from a mobile terminal and the information read from the two-dimensional-barcode image is passed and the third-party server sets the user account to the logged-in state.

Figure 9:
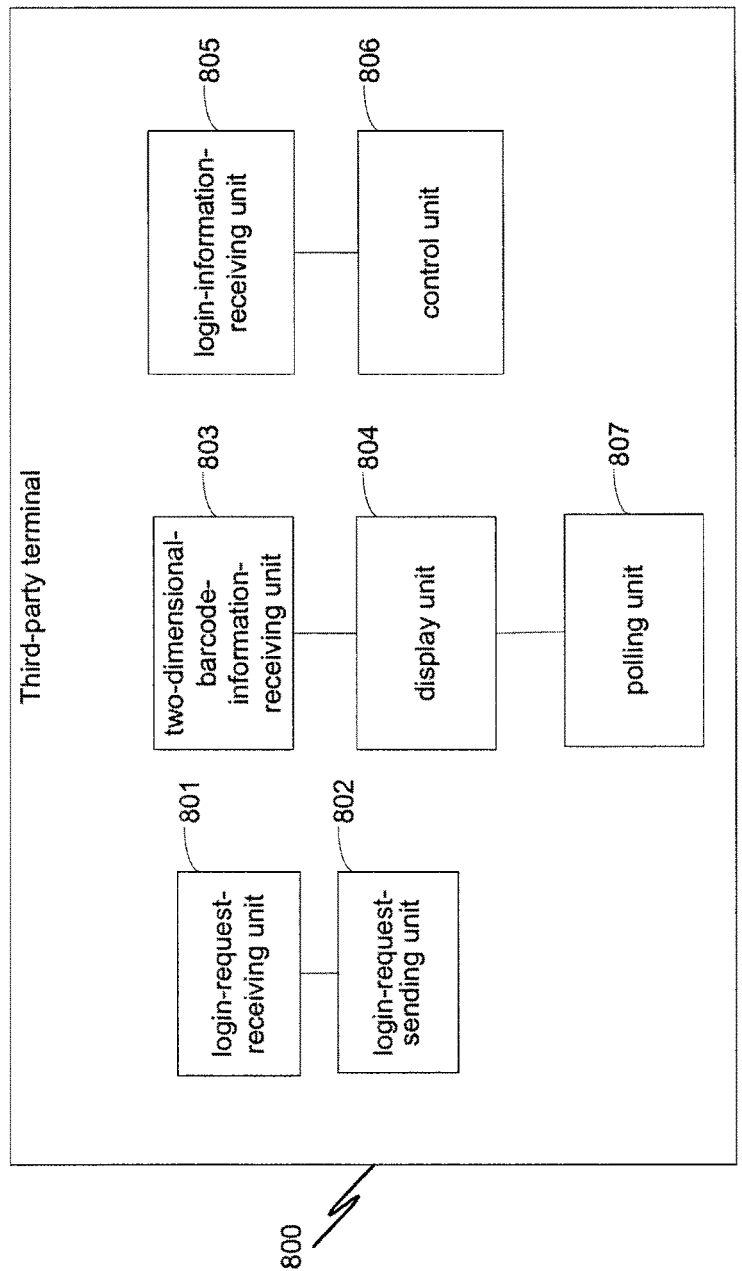
FIG. 9 is a simplified diagram showing a third-party terminal according to another embodiment of the present invention.

FIG. 9 is a simplified diagram showing the third-party terminal 800 according to another embodiment of the present invention. This diagram is merely an example, which should not unduly limit the scope of the claims. One of ordinary skill in the art would recognize many variations, alternatives, and modifications. The third-party terminal 800 further includes a polling unit 807 connected to the display unit 804. According to one embodiment, the polling unit 807 is configured to regularly send authorization inquiries to the third-party server after the display unit 804 displays the two-dimensional-barcode image.

Figure 10:
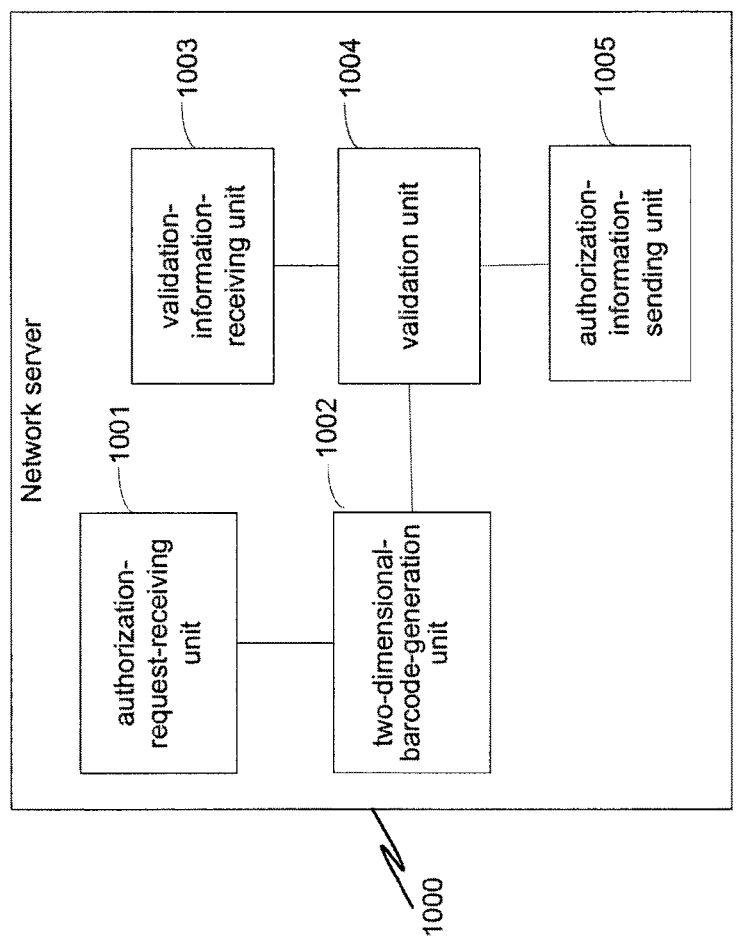
FIG. 10 is a simplified diagram showing a network server according to one embodiment of the present invention.

FIG. 10 is a simplified diagram showing a network server according to one embodiment of the present invention. This diagram is merely an example, which should not unduly limit the scope of the claims. One of ordinary skill in the art would recognize many variations, alternatives, and modifications. The network server 1000 includes an authorization-request-receiving unit 1001, a two-dimensional-barcode-generation unit 1002, a validation-information-receiving unit 1003, a validation unit 1004 and an authorization-information-sending unit 1005.

According to one embodiment, the two-dimensional-barcode-generation unit 1002 is connected the authorizationrequest-receiving unit 1001. For example, the validation unit 1004 is connected to the validation-information-receiving unit 1003 and the two-dimensional-barcode-generation unit 1002. In another example, the authorization-information-sending unit 1005 is connected to the validation unit 1004. In yet another example, the authorization-request-receiving unit 1001 is configured to receive an authorization request sent from a third-party terminal. In yet another example, the authorization request may include one or more authorization parameters such as an application identifier (e.g., "appid"), authorization scope information (e.g., "scope"), an application callback address (e.g., "redirect_url"), anti-disguise information (e.g., "state") and/or an application key (e.g., "appkey"). In yet another example, the two-dimensional-barcode-generation unit 1002 is configured to generate two-dimensional-barcode information after the authorization-request-receiving unit 1001 receives the authorization request sent from the third-party terminal. In yet another example, the two-dimensional-barcode information includes the authorization parameters.

According to another embodiment, the validation-information-receiving unit 1003 is configured to receive user account information and the two-dimensional-barcode information sent from a mobile terminal. For example, the validation unit 1004 is configured to validate the user account information and the two-dimensional-barcode information received by the validation-information-receiving unit 1003 according to stored user account information and other two-dimensional-barcode information generated by the two-dimensional-barcode-generation unit 1002. In another example, the two-dimensional-barcode information received by the validation-information-receiving unit 1003 is acquired by the mobile terminal from the two-dimensional-barcode image displayed on the third-party terminal. In yet another example, the authorization-information-sending unit 1005 is configured to send the authorization information and the predetermined user identifier to the third-party server after the validation of the validation unit 1004 is passed. In one example, a user identifier uniquely corresponds to a user account. In another example, when a user account logs into different third-party applications, the user account corresponds to different user identifiers. For example, the authorization information includes an authorization validity character string (e.g., "token") and anti-disguise information (e.g., "state").

Figure 11:
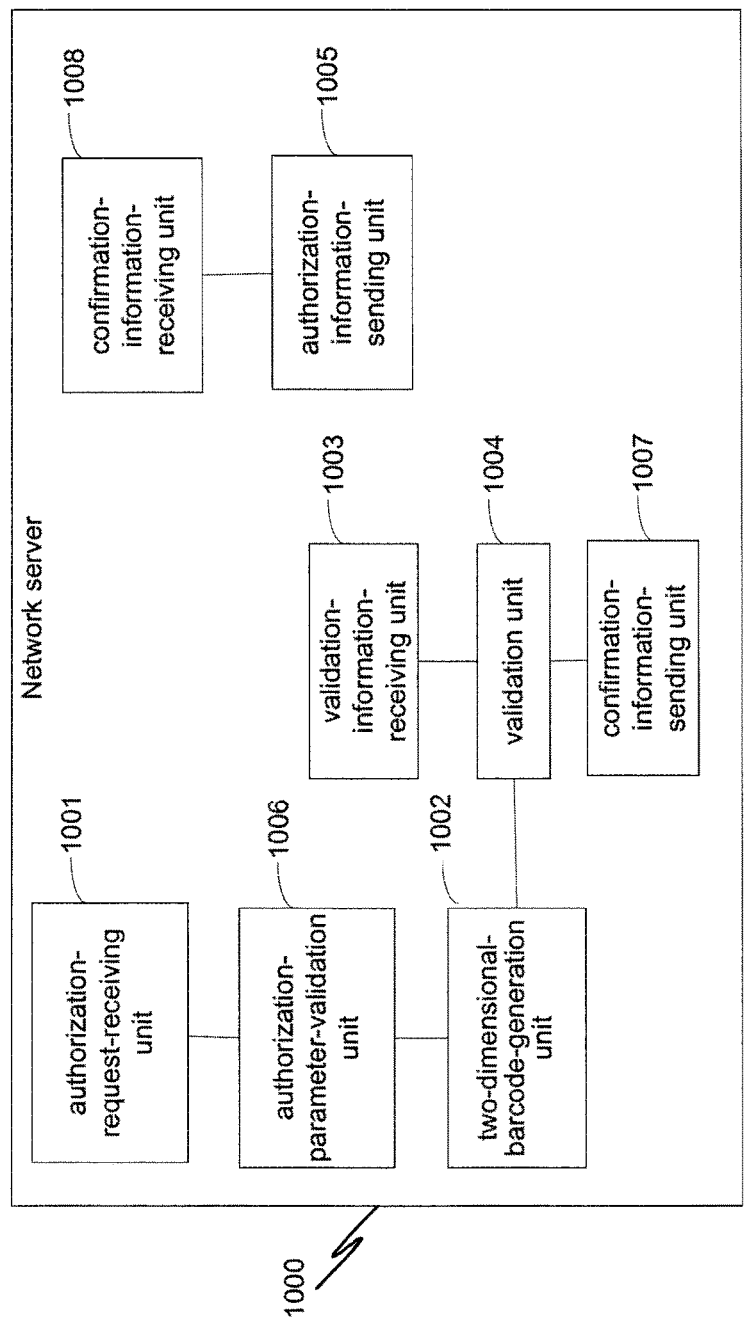
FIG. 11 is a simplified diagram showing a network server according to another embodiment of the present invention.

FIG. 11 is a simplified diagram showing the network server 1000 according to another embodiment of the present invention. This diagram is merely an example, which should not unduly limit the scope of the claims. One of ordinary skill in the art would recognize many variations, alternatives, and modifications. In addition to the authorization-request-receiving unit 1001, the two-dimensional-barcode-generation unit 1002, the validation-information-receiving unit 1003, the validation unit 1004, and the authorization-information-sending unit 1005, the network server 1000 further includes an authorization-parameter-validation unit 1006, a confirmation-information-sending unit 1007 and a confirmation-information-receiving unit 1008.

According to one embodiment, the authorization-parameter-validation unit 1006 is connected between the authorization-request-receiving unit 1001 and the two-dimensional-barcode-generation unit 1002. For example, the validation unit 1004 is connected to the validation-information-receiving unit 1003 and the two-dimensional-barcode-generation unit 1002. In another example, the confirmation-information-sending unit 1007 is connected to the validation unit 1004. In yet another example, the authorization-information-sending unit 1005 is connected to the confirmation-information-receiving unit 1008. In yet another example, the authorization-parameter-validation unit 1006 is configured to validate the authorization parameters in the authorization request received by the authorization-request-receiving unit 1001 and if the validation is successful, the two-dimensional-barcode-generation unit 1002 generates two-dimensional-barcode information.

According to another embodiment, the confirmation-information-sending unit 1007 is configured to send validation-success information to a mobile terminal after the validation of the validation unit 1004 is passed and before the authorization-information-sending unit 1005 sends the authorization information and the predetermined user identifier to the third-party server. For example, the confirmation-information-receiving unit 1008 is configured to receive the authorization confirmation from the user sent from the mobile terminal so that the authorization-information-sending unit 1005 sends the authorization information and the predetermined user identifier to the third-party server.

In some embodiments, a mobile terminal as specified herein refers to user equipment, including a cell phone, a tablet and/or other suitable equipment capable of recording. For example, a third-party terminal as specified herein includes a personal computer, a TV, a public-inquiry machine, and/or other suitable equipment with displaying capabilities. As an example, a third-party terminal is configured to display a login interface and an application interface of a third-party application to users. In another example, a network server as specified herein refers to a server that provides a user-login technology to a third party based on a user-account system. In yet another example, the network server may provide software development kits (SDK) of different platforms and help a third party with user-login functions, sharing functions in the applications. In yet another example, a network server can manage user accounts or call user accounts. In yet another example, a third-party server as specified herein refers to a server for a third-party application.

According to one embodiment, a method is provided for login and authorization. For example, a third-party terminal receives a login request from a user and sends an authorization request from the third-party terminal to a network server; the network server generates first two-dimensional-barcode information and sends the first two-dimensional-barcode information to the third-party terminal; the third-party terminal displays a first two-dimensional-barcode image; a mobile terminal extracts the first two-dimensional-barcode information from the first two-dimensional-barcode image and sends first user account information and the first two-dimensional-barcode information to the network server; the network server validates the first user account information and the first two-dimensional-barcode information based on at least information associated with stored second user account information and second two-dimensional-barcode information generated by the network server; in response to the first user account information and the first two-dimensional-barcode information being validated, the network server sends an authorization and a predetermined user identifier to a third-party server; the third-party server sets a user account associated with the user identifier to a logged-in state; the third-party terminal acquires information related to the logged-in state from the third-party server and sets an interface of a first third-party application to a user-logged-in state. For example, the method is implemented according to at least FIG. 1 and/or FIG. 2.

According to another embodiment, a method is provided for login. For example, a login request is received from a user; an authorization request is sent to a network server; two-dimensional-barcode information is received from the network server; a two-dimensional-barcode image is displayed; information related to a logged-in state of a user account is acquired from a third-party server; and an interface of a third-party application is set to a user-logged-in state. The third-party server sets the user account to the logged-in state and sends the information related to the logged-in state of the user account after the network server validates user account information sent from a mobile terminal and the two-dimensional-barcode information extracted from the first two-dimensional-barcode image. For example, the method is implemented according to at least FIG. 3 and/or FIG. 4.

According to yet another embodiment, a method is provided for authorization. For example, an authorization request is received from a third-party terminal; first two-dimensional-barcode information is generated; the first two-dimensional-barcode information is sent to the third-party terminal so that the third-party terminal displays a first two-dimensional-barcode image; user account information and the first two-dimensional-barcode information sent from a mobile terminal are validated based on at least information associated with stored user account information and second two-dimensional-barcode information, wherein the first two-dimensional-barcode information sent from the mobile terminal is extracted by the mobile terminal from the first two-dimensional-barcode image displayed on the third-party terminal; and in response to the user account information and the first two-dimensional-barcode information being validated, an authorization and a predetermined user identifier are sent to the third-party server. For example, the method is implemented according to at least FIG. 5 and/or FIG. 6.

According to yet another embodiment, a login-and-authorization system includes: a third-party terminal, a network server, a mobile terminal and a third-party server. The third-party terminal is configured to: receive a login request from a user, send an authorization request to the network server, receive first two-dimensional-barcode information from the network server, display a first two-dimensional-barcode image, acquire information related to a logged-in state of a user account from the third-party server, and set an interface of a third-party application to a user-logged-in state. The network server is configured to: receive the authorization request from the third-party terminal; generate the first two-dimensional-barcode information, send the first two-dimensional-barcode information to the third-party terminal, validate user account information and the first two-dimensional-barcode information sent from the mobile terminal based on at least information associated with stored user account information and second two-dimensional-barcode information, and in response to the user account information and the first two-dimensional-barcode information being validated, send an authorization and a predetermined user identifier to the third-party server. The mobile terminal is configured to extract the first two-dimensional-barcode information from the first two-dimensional-barcode image displayed by the third-party terminal and send the user account information and the first two-dimensional-barcode information to the network server. The third-party server is configured to set the user account associated with the user identifier sent from the network server to the logged-in state. For example, the system is implemented according to at least FIG. 7.

For example, in the login-and-authorization system, the authorization request includes one or more authorization parameters, and the network server is configured to validate the authorization parameters in the authorization request. In another example, the authorization parameters include at least one of an application identifier, authorization scope information, an application callback address, anti-disguise information and an application key. In yet another example, the first two-dimensional-barcode information includes the authorization parameters. In yet another example, the third-party terminal is further configured to send at a predetermined time an authorization inquiry to the third-party server.

As an example, in the login-and-authorization system, the network server is further configured to, in response to the first user account information and the first two-dimensional-barcode information being validated, send validation-success information to the mobile terminal. The mobile terminal is further configured to: display information related to authorization confirmation; receive an authorization confirmation from the user; and send the authorization confirmation to the network server. The network server is further configured to send the authorization and the predetermined user identifier to the third-party server. As another example, the information related to authorization confirmation includes a name and an authorization scope of the first third-party application. As yet another example, the user identifier corresponds to the user account, and the user account corresponds to different user identifiers when the user account logs into different third-party applications. As yet another example, the third-party server is further configured to validate the authorization from the network server. As yet another example, the authorization includes an authorization-validity character string and anti-disguise information.

In one embodiment, a third-party terminal includes: a login-request-receiving unit, a login-request-sending unit, a two-dimensional-barcode-information-receiving unit, a display unit, a login-information-receiving unit, and a control unit. The login-request-receiving unit is configured to receive a login request from a user. The login-request-sending unit is configured to send an authorization request to a network server. The two-dimensional-barcode-information-receiving unit is configured to receive two-dimensional-barcode information from the network server. The display unit is configured to display a two-dimensional-barcode image. The login-information-receiving unit is configured to receive information related to a logged-in state of a user account from a third-party server. The control unit is configured to set an interface of a third-party application to a user-logged-in state based on at least information associated with the information related to the logged-in state of the user account. The third-party server sets the user account to the logged-in state and sends the information related to the logged-in state of the user account after the network server validates user account information sent from a mobile terminal and the two-dimensional-barcode information extracted from the first two-dimensional-barcode image. For example, the third-party terminal is implemented according to at least FIG. 8 and/or FIG. 9.

In another embodiment, a network server includes: an authorization-request-receiving unit, a two-dimensional-barcode-generation unit, a two-dimensional-barcode-sending unit, a validation-information-receiving unit, a validation unit, and an authorization-information-sending unit. The authorization-request-receiving unit is configured to receive an authorization request from a third-party terminal. The two-dimensional-barcode-generation unit is configured to generate first two-dimensional-barcode information. The two-dimensional-barcode-sending unit is configured to send the first two-dimensional-barcode information to the third-party terminal so that the third-party terminal displays a first two-dimensional-barcode image. The validation-information-receiving unit is configured to receive user account information and the first two-dimensional-barcode information from a mobile terminal. The validation unit is configured to validate the user account information and the first two-dimensional-barcode information based on at least information associated with stored user account information and second two-dimensional-barcode information generated by the two-dimensional-barcode-generation unit, wherein the first two-dimensional-barcode information sent from the mobile terminal is extracted by the mobile terminal from the first two-dimensional-barcode image displayed on the third-party terminal. The authorization-information-sending unit is configured to, in response to the user account information and the first two-dimensional-barcode information being validated, send an authorization and a predetermined user identifier to the third-party server. For example, the server is implemented according to at least FIG. 10 and/or FIG. 11.

In yet another embodiment, a non-transitory computer readable storage medium includes programming instructions for login. The programming instructions configured to cause one or more data processors to execute certain operations. For example, a login request is received from a user; an authorization request is sent to a network server; two-dimensional-barcode information is received from the network server; a two-dimensional-barcode image is displayed; information related to a logged-in state of a user account is acquired from a third-party server; and an interface of a third-party application is set to a user-logged-in state. The third-party server sets the user account to the logged-in state and sends the information related to the logged-in state of the user account after the network server validates user account information sent from a mobile terminal and the two-dimensional-barcode information extracted from the first two-dimensional-barcode image. For example, the storage medium is implemented according to at least FIG. 3 and/or FIG. 4.

In yet another embodiment, a non-transitory computer readable storage medium includes programming instructions for authorization. The programming instructions configured to cause one or more data processors to execute certain operations. For example, an authorization request is received from a third-party terminal; first two-dimensional-barcode information is generated; the first two-dimensional-barcode information is sent to the third-party terminal so that the third-party terminal displays a first two-dimensional-barcode image; user account information and the first two-dimensional-barcode information sent from a mobile terminal are validated based on at least information associated with stored user account information and second two-dimensional-barcode information, wherein the first two-dimensional-barcode information sent from the mobile terminal is extracted by the mobile terminal from the first two-dimensional-barcode image displayed on the third-party terminal; and in response to the user account information and the first two-dimensional-barcode information being validated, an authorization and a predetermined user identifier are sent to the third-party server. For example, the storage medium is implemented according to at least FIG. 5 and/or FIG. 6.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for login comprising:
receiving a login request from a user;
sending an authorization request to a network server;
receiving first two-dimensional-barcode information from the network server;
displaying a first two-dimensional-barcode image;
acquiring information related to a logged-in state of a user account from a third-party server; and
setting an interface of a third-party application to a user-logged-in state;
wherein the third-party server sets the user account to the logged-in state and sends the information related to the logged-in state of the user account after the network server validates user account information sent from a mobile terminal and the first two-dimensional-barcode information extracted from the first two-dimensional-barcode image;
wherein:
the authorization request includes authorization parameters to be validated by the network server; and
the authorization parameters include an application identifier, authorization scope information, an application callback address, anti-disguise information and an application key.

2. The method of claim 1, wherein the first two-dimensional-barcode information includes the authorization parameters.

3. The method of claim 1, further comprising:
sending at a predetermined time an authorization inquiry to the third-party server.

4. A method for authorization comprising:
receiving an authorization request from a third-party terminal;
generating first two-dimensional-barcode information;
sending the first two-dimensional-barcode information to the third-party terminal so that the third-party terminal displays a first two-dimensional-barcode image;
validating user account information and the first two-dimensional-barcode information sent from a mobile terminal based on at least information associated with stored user account information and second two-dimensional-barcode information, wherein the first two-dimensional-barcode information sent from the mobile terminal is extracted by the mobile terminal from the first two-dimensional-barcode image displayed on the third-party terminal; and
in response to the user account information and the first two-dimensional-barcode information being validated, sending an authorization and a predetermined user identifier to the third-party server;
wherein:
the authorization request includes authorization parameters; and
the authorization parameters include an application identifier, authorization scope information, an application callback address, anti-disguise information and an application key.

5. The method of claim 4, further comprising:
validating the authorization parameters in the authorization request.

6. The method of claim 5, wherein the first two-dimensional-barcode information includes the authorization parameters.

7. The method of claim 4, wherein the in response to the user account information and the first two-dimensional-barcode information being validated, sending an authorization and a predetermined user identifier to the third-party server includes:
in response to the user account information and the first two-dimensional-barcode information being validated, sending validation-success information to the mobile terminal;
receiving an authorization confirmation of a user from the mobile terminal; and
sending the authorization and the predetermined user identifier to the third-party server.

8. The method of claim 4, wherein:
the user identifier corresponds to the user account; and
the user account corresponds to different user identifiers when the user account logs into different third-party applications.

9. The method of claim 4, wherein the authorization includes an authorization-validity character string and anti-disguise information.

10. A network server comprising:
an authorization-request-receiving unit configured to receive an authorization request from a third-party terminal;
a two-dimensional-barcode-generation unit configured to generate first two-dimensional-barcode information;
a two-dimensional-barcode-sending unit configured to send the first two-dimensional-barcode information to the third-party terminal so that the third-party terminal displays a first two-dimensional-barcode image;

a validation-information-receiving unit configured to receive user account information and the first two-dimensional-barcode information from a mobile terminal;
a validation unit configured to validate the user account information and the first two-dimensional-barcode information based on at least information associated with stored user account information and second two-dimensional-barcode information generated by the two-dimensional-barcode-generation unit, wherein the first two-dimensional-barcode information sent from the mobile terminal is extracted by the mobile terminal from the first two-dimensional-barcode image displayed on the third-party terminal; and
an authorization-information-sending unit configured to, in response to the user account information and the first two-dimensional-barcode information being validated, send an authorization and a predetermined user identifier to the third-party server;
wherein:
the authorization request includes authorization parameters; and
the authorization parameters include an application identifier, authorization scope information, an application callback address, anti-disguise information and an application key.

11. The network server of claim 10, further comprising:
an authorization-parameter-validation unit configured to validate the authorization parameters in the authorization request.

12. The network server of claim 10, wherein the first two-dimensional-barcode information includes the authorization parameters.

13. The network server of claim 10, further comprising:
a confirmation-information-sending unit configured to, in response to the user account information and the first two-dimensional-barcode information being validated, send validation-success information to the mobile terminal; and
a confirmation-information-receiving unit configured to receive an authorization confirmation of a user from the mobile terminal;
wherein the authorization-information-sending unit is further configured to send the authorization and the predetermined user identifier to the third-party server.

14. The network server of claim 10, wherein:
the user identifier corresponds to the user account; and
the user account corresponds to different user identifiers when the user account logs into different third-party applications.

15. The network server of claim 10, wherein the authorization includes an authorization-validity character string and anti-disguise information.

16. The network server of claim 10, further comprising:
one or more data processors; and
a computer-readable storage medium;
wherein one or more of the authorization-request-receiving unit, the two-dimensional-barcode-generation unit, the two-dimensional-barcode-sending unit, the validation-information-receiving unit, the validation unit, and the authorization-information-sending unit are stored in the storage medium and configured to be executed by the one or more data processors.

* * * * *